US006293912B1

United States Patent
Sørensen

(10) Patent No.: US 6,293,912 B1
(45) Date of Patent: Sep. 25, 2001

(54) ULTRASOUND SCANNER WITH BEAM FORMER

(75) Inventor: Ole Møller Sørensen, Roskilde (DK)

(73) Assignee: B-K Medical A/S, Gentofte (DK)

(*) Notice: Subject to any disclaimer, the term of this patent is extended or adjusted under 35 U.S.C. 154(b) by 0 days.

(21) Appl. No.: 09/329,491

(22) Filed: Jun. 10, 1999

(51) Int. Cl.[7] .................................................. A61B 8/00
(52) U.S. Cl. ............................................................. 600/437
(58) Field of Search ......................... 600/443, 447, 600/437, 441; 367/7, 103; 73/625, 626, 641, 642

(56) References Cited

U.S. PATENT DOCUMENTS

| 4,305,296 | 12/1981 | Green et al. ........................... 73/626 |
| 4,566,459 | 1/1986 | Umemura et al. ................... 128/660 |
| 4,633,308 | * 12/1986 | Dukes et al. ......................... 358/112 |
| 4,733,562 | 3/1988 | Saugeon ................................. 73/626 |
| 4,926,872 | * 5/1990 | Brock-Fisher et al. .............. 600/457 |
| 4,974,558 | 12/1990 | Katakura et al. . |
| 5,143,075 | 9/1992 | Ishizuka . |
| 5,148,810 | 9/1992 | Maslak et al. . |
| 5,263,004 | * 11/1993 | Larson, III ........................... 600/447 |
| 5,322,068 | 6/1994 | Thiele et al. . |
| 5,417,217 | 5/1995 | Morita et al. . |
| 5,997,479 | * 12/1999 | Savord et al. ........................ 600/447 |
| 6,106,472 | * 8/2000 | Chiang et al. ........................ 600/447 |
| 6,146,329 | * 11/2000 | Hayakawa ........................... 600/443 |

FOREIGN PATENT DOCUMENTS

| 0 451 517 A1 | 10/1991 | (EP) . |
| 0 474 341 A2 | 3/1992 | (EP) . |
| 0 480 086 A1 | 4/1992 | (EP) . |
| 0 504 841 A2 | 9/1992 | (EP) . |

OTHER PUBLICATIONS

PCT International Search Report dated Oct. 19, 2000 (3 pages).

* cited by examiner

Primary Examiner—Marvin M. Lateef
Assistant Examiner—Ali M. Imam
(74) Attorney, Agent, or Firm—Finnegan, Henderson, Farabow, Garrett & Dunner, L.L.P.

(57) ABSTRACT

The apparatus for examining an object by means of ultrasound has an emitting transducer and a receiving transducer with a plurality of transducer elements. Electrical signals from the receiving transducer elements are selectively connected to input taps of a single delay line for individually delaying the electrical signals to compensate for their different distances from points under investigation in the object. For each point in the object a first received echo signal is connected to a first input tap giving a first delay, and subsequently received echo signals are connected to input taps being selected so that the subsequent electrical signals are output on the output tap substantially simultaneously with the electrical signal representing said first received echo. The receiving transducer is thereby adjusted currently during the reception of each scan line to perfectly adapt its focus at each instant in time and with an exceptionally high degree of accuracy. Additionally, switching noise in the switching network at the input of the delay line is canceled by first recording a scan line without signal from the emitting transducer as reference signals and subtracting these scan line reference signals from subsequent ultrasound echo signals.

2 Claims, 1 Drawing Sheet

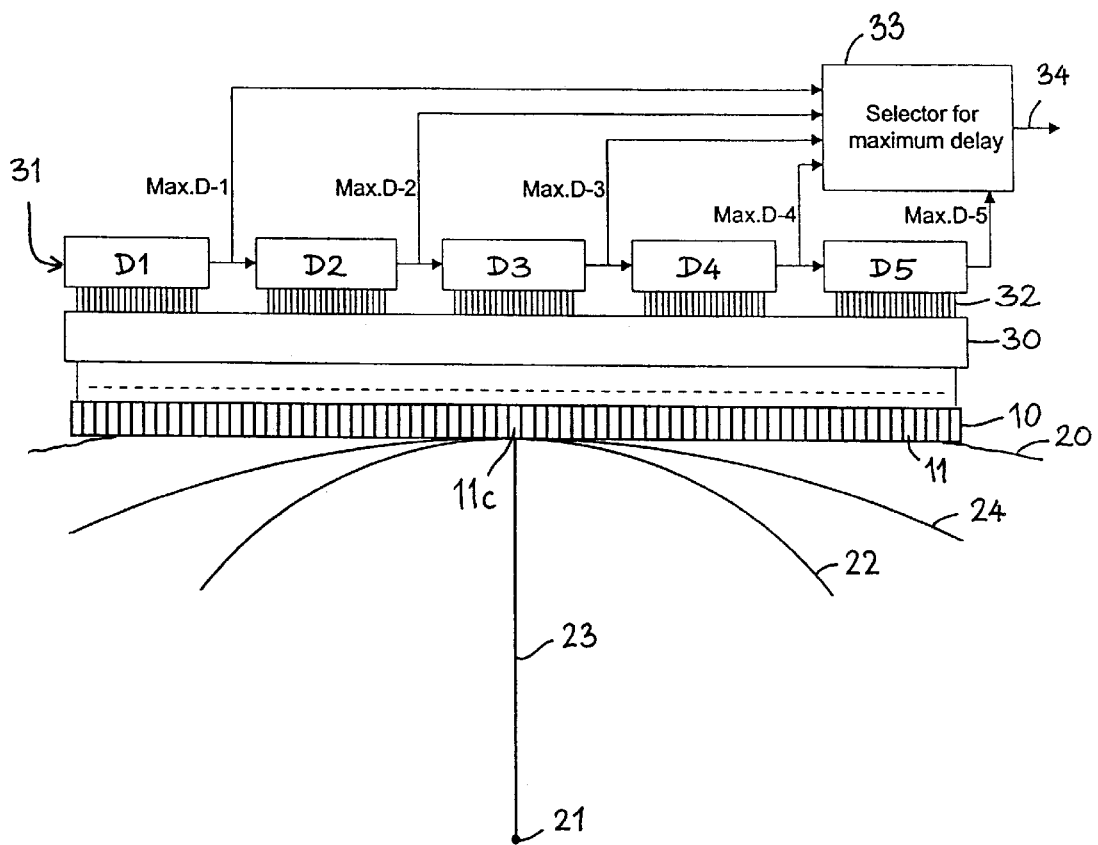

ULTRASOUND SCANNER WITH BEAM FORMER

FIELD OF THE INVENTION

This invention relates to imaging ultrasound equipment and in particular ultrasound equipment used in medical diagnosis.

BACKGROUND OF THE INVENTION

Imaging ultrasound systems used for medical diagnostic purposes most often comprise an ultrasound transducer having an array of piezoelectric elements. When an electrical voltage is supplied across a piezoelectric element, the piezoelectric element will change its physical dimensions in one or more directions in response to the supplied voltage. In imaging ultrasound systems a short electrical pulse is supplied over the piezoelectric elements, which excites the elements and causes them to oscillate at their ultrasound resonance frequency, which is typically in the megahertz range. The oscillation is a burst with a short duration. When the array of piezoelectric elements is placed in contact with the skin of a human being or an animal, the combined ultrasound burst from the piezoelectric elements will propagate into the body of the human being or the animal. Soft tissue in the body will transmit the ultrasound into the body, and boundaries between organs and other irregularities, eg within an organ, will reflect and scatter a fraction of the ultrasound energy. A fraction of the reflected ultrasound energy will reach the piezoelectric elements of the transducer as an echo and cause the elements to vibrate in response to the received echo, whereby each of the piezoelectric elements will generate an electrical signal corresponding to the received, reflected ultrasound energy. The thus generated electrical signals are analysed and processed to give information about the structures in the body, and the information can be processed to give eg image information.

In order to have good spatial resolution and a good signal-to-noise ratio, the excitation signals to the array of piezoelectric elements are phased or delayed relative to each other, whereby the ultrasound energy from the transducer can be focused to a beam in a desired direction and at a desired distance from the transducer. By proper relative phasing or delaying the excitation signals the beam can be scanned or swept across a plane, whereby a rectangular area or an angular sector in the body is scanned. Scanning or sweeping the scan lines can also be achieved by electronically shifting the transducer aperture of active transducer elements along the length of the transducer.

Echo signals received from a particular point of observation at a certain distance in a certain direction from the transducer will reach the piezoelectric elements of the transducer at different times due to the non-uniform distances from the point of observation to the piezoelectric elements. In order to obtain optimum directivity at each particular depth or distance from the transducer, ie good spatial resolution in the direction transverse to the beam, the electrical signals corresponding to the echo signals received by the elements in the transducer aperture, are therefore delayed dynamically relative to one another as a function of their distance. This results in a receive focusing and is called beam forming. The delay function depends upon the echo distance from the transducer and the physical dimensions of the transducer. As the echo-distance increases during the receive time of the scan line, the delay function must be correspondingly adapted to change the focus of the beam, so that the focus of the receive beam is changed adaptively. This is called dynamic receive focusing, or DRF. The sum of all delayed signals represents the final beam signal. Signals from other directions will not be time correlated and consequently their signals will be attenuated relative to the main beam signal. The obtained degree of beam directivity strongly depends upon the number of signal input channels present in the beam former circuit.

To obtain a constant beam shape or directivity as a function of distance, it is required that the ratio between the receive distance and the physical width of the transducer aperture is constant. This ratio is limited by the maximum number of signals from transducer elements which can be processed by the receive system. For echoes received from objects close to the transducer surface the aperture must be narrow, and to receive at larger distances, the aperture must be correspondingly wider. For each scan line the number of active transducer elements is increased currently to give a constant ration to the receive distance, and at a certain distance the aperture is fully opened, ie to maximum physical width, and from this point on the beam shape will widen and will no longer be constant as a function of distance. The function of opening the aperture, ideally from one element and incrementally up to the maximum number of aperture elements, is called the aperture function. The relation between receive distance and aperture width is called the aperture FIGURE. Due to the aperture function, the DRF system must also provide means of changing the width of the aperture, this because that the aperture opening is also a dynamic function following the distance of receiving and implementing a certain desired aperture FIGURE.

The most common way to obtain DRF in analog beam formers is to have two complete sets of delay circuits. While one delay circuit is being used for receiving and processing ultrasound echoes from a certain depth, the other circuit is being programmed with delay values corresponding to the next, greater depth. Then the roles are reversed, and each circuit thus alternates between signal processing and circuit-programming, and during the time between two alternations the apparatus receives and processes echo signals from a certain depth interval or zone. This method is known as the zone method or "ping-pong" method. Each zone represents some receive time (a few microseconds), and thereby a range of a few millimeters in tissue depth. While the output signal from one zone circuit is processed, the other zone circuit is programmed to obtain focus in the receive zone to follow. This concept needs two complete sets of perfectly matching delay lines and switching components. It also requires a very high performance signal switch for the real time alternation between the two zone-outputs. The concept does however perform in real time, meaning that only one scan line is needed to obtain the complete scan line information. Therefore it does not limit the frame rate of the ultrasound scanner.

With the "ping pong" method a constant focus setting is maintained at minimum for the depth of one depth-zone, ie a few microseconds. This implies that that the opening of the aperture must follow the steps in distance given by the zone width. A consequence of this is deviations in the resulting beam shape, as the aperture FIGURE is not constant within any zone.

A cheaper way of implementing the DRF is to use just one set of delay and switch components. Doing this, settings of the beam former circuit are performed at intervals along the scan line. The output signal from this process contains zones with correct receive information alternating with zones with programming noise. Then another scan line is generated in the same direction. For this second scan line the focus programming is performed time-shifted relative to the first line. The two sets of information are then combined digitally into one complete scan line without programming noise. The quality of such a composite receive focus system can be quite sufficient, but as it make use of at least two scan lines to create one line, and the frame rate of the scanner is reduced by at least 50% relative to a real time system.

SUMMARY OF THE INVENTION

This invention uses a single delay line with a chain of delay components and a signal switching matrix for switching and connecting the individual electrical signals from the array of piezoelectric transducer elements to selected input taps of the delay line for obtaining the desired delays for the individual transducer signals resulting in the desired focus of the transducer.

In order to have the receiving transducer focused, at each instant in time, on the exact depth or distance of origin of the instantly received echoes, the delay is changed individually for each signal connection according to a predefined scheme. For each individual signal the delay is changed incrementally to meet the instantaneous demand, ie at a time where the incremental change in delay for the individual signal connection results in smaller deviation from the ideal receive focus than what is obtained with the actual delay for the current connection.

This is in contrast to other known methods, where many or all signal connections are changed simultaneously at larger predefined intervals for each focus setting, which then is kept constant for a predefined interval corresponding to a new focusing zone.

The method according to the invention of changing the signal connections individually is as an incremental change of delay settings, rather than a zone-based approach with many changes in each reprogramming cycle, and the method is referred to as Incremental Analog Beam Forming (IABF). Because of this, the known "zone"-systems use relatively few, but complex changes of settings during a scan line (typical 50 to 100 zones per scan line), the IABF system of the present invention uses several thousands, but simple changes during one scan line.

The receive focus of the IABF system, and consequently the width of the receive beam, can in practice be maintained with very small deviations from the theoretical ideal. In the known zone-based systems, the focus is changing depending upon the width of the zones in time and thereby upon distance.

As the IABF system according to the invention uses only small incremental changes, the switching noise related to these changes are corresponding lower than the noise generated when many signals are switched simultaneously as in the known focus zone systems. In the IABF system according to the invention the switching noise is always present in the summed output of the delay chain. According to the invention the switching noise is removed from the signal by the following method.

The noise reduction system of the IABF system operates by performing a reference recording of the switching noise, taking one "zero signal" scan line at the beginning of each new sector scan. By "zero signal" is meant that no ultrasound emission takes place, and all preamplifiers are set to minimum gain, whereby only a low level of insignificant random noise and the switching noise is present. This residual noise is digitized and stored in a memory such as a RAM device. The switching noise is deterministic and constant as long as the focus function along the scan line is constant. In the subsequent signal processing of the scan lines containing both echo signals and switching noise, the digitized noise signal from the "zero signal" scan line is subtracted is subtracted digitally from the scan line, whereby a clean echo signal for the scan line is produced, in real time, which is free from switching noise.

During the remaining scan lines of the following sector scan, the noise reference values are read from the RAM device, and digitally subtracted from the sum of noise and echo signal. The result of this process is a clean real time beam signal with no switching noise for the whole sector scan. This is a great advantage of the invention.

As the beam signal is digitized, sampling interference will take place at times where the sampling frequency is precisely an integer multiple of the signal frequency. The worst case will occur if every second sample is taken at the zero crossing of the beam signal. As the signal is also detected, compressed and low pass filtered, the sampling interference might reduce the dynamic range of the signal by half. To avoid this interference a digital process named "hole filling" is used. This process operates in real time with the sampling frequency, and evaluates the amplitude of every sample, disregarding the sign, in relation to the previous sample and the following sample. If a sudden high level drop in amplitude is detected, the low-value sample is replaced by the average of the preceding sample and the following sample.

When the digitized beam signal has passed the subtraction of switching noise and the "hole filling", the signal is compressed using a digital look-up table concept. During this process any mapping function between the detected beam signal and the beam output can be introduced. Typically, a logarithmic function will be used, whereby the signal is compressed reducing its dynamic range. After the signal compression, the signal is converted to analog form for low pass filtering. The output of this filtering is the final beam signal representing the envelope of the received echo signals, which can then form the basis of forming a two-dimensional image.

The IABF concept according to the invention offers several advantages. Only one chain of delay components is needed for obtaining real time performance. There are no focus zones and thus no requirements for circuit-matching between zones. The opening of the transducer aperture is also done incrementally with a width resolution limited only by the number of elements in the full aperture. Incremental aperture opening in combination with the incremental focus function, results in the receive beam focus being close to ideal. The switching noise is low. Signal compression and detection is stable and digital, and the compression can be performed according to any desired function, eg logarithmic. The beam signal is generated in real time, giving no reduction in frame rate, whereby the system operates in real time. The cost of components for a specific number of input channels from the transducer is approximate half the cost of traditional zone based system.

BRIEF DESCRIPTION OF THE DRAWING

The FIGURE shows schematically an ultrasound medical diagnostic system according to the invention.

DETAILED DESCRIPTION OF THE INVENTION

The ultrasound medical diagnostic system in the FIGURE has a transducer 10 comprising an array of individual piezoelectric transducer elements 11 arranged in a linear row. The row may be curved if so desired. The transducer 10 is shown in its intended use, where it is placed against the skin 20 of a human being or an animal with its piezoelectric transducer elements 11 in ultrasonic acoustic contact with the skin 20. An ultrasound contact or transmission medium can be used between the transducer surface and the skin. For emitting ultrasound signals the shown transducer 10 is preferably used, or a separate emitting ultrasound transducer (not shown) may be used. For receiving ultrasound echoes from the tissue below the skin of the person or animal under examination the shown transducer 10 is used. The emission of ultrasound signals or pulses is not considered in detail in this context, since the invention relates to the reception and processing of received ultrasound echo signals.

In the FIGURE is schematically shown a small tissue structure 21 below the skin 20 of the person under examination. The FIGURE shows the situation after an ultrasound signal has been emitted from the transducer 10 into the body of the person under examination. The tissue structure 21, which represents a point of an organ boundary or other discontinuity or irregularity in the body, has reflected a fraction of the ultrasound signal as an echo, which will propagate as a spherical wave with the tissue structure 21 as the center. The FIGURE shows a spherical ultrasound wave front 22 representing the echo originating from the tissue structure 21 at the instant where the wave front 22 first reaches the transducer 10. Since the distance from the tissue structure 21 to the different parts of the transducer is not constant, the spherical wave front 22 will not reach the different transducer elements 11 simultaneously, but the transducer element 11c situated on the scan line 23 of propagation perpendicular to the surface of the transducer 10 will be the first of the transducer elements 11 to receive the echo from the tissue structure 21. The remaining of the transducer elements 11 will receive the wave front 22 later than the transducer element 11c, and the transducer elements 11 at the ends of the transducer will be the last to receive the wave front 22.

The FIGURE also shows another spherical wave front 24 representing an ultrasound echo originating from a tissue structure (not shown) on the same scan line 23 but at a greater depth under the skin than the tissue structure 21, and the echo represented by the wave front 24 will therefore arrive later at the transducer than the wave front 22, and, as clearly shown in the FIGURE, the wave front 24 has a larger diameter than the wave front 22. Due to the larger diameter of the wave front 24 than that of the wave front 22, the wave front 24 will arrive at the transducer elements 11 at the ends of the transducer with a smaller time difference as compared to the time difference for the wave front 22.

The difference in time of reception of the wave front by the different transducer elements thus depends on the distance from the tissue structure to the transducer, ie the depth in the body. Ultrasound echoes from structures deeper in the body will reach the transducer later, and with a smaller difference in time between the first and the last transducer element to receive the echo wave front due to the larger depth in the body under examination.

When the transducer elements 11 receive an ultrasound echo from a particular point in the body, they will each generate an electrical signal corresponding to the received echo. The thus generated electrical signals will be time shifted relative to each other due to the different times of arrival of the wave front at the individual transducer elements. It is desirable to have all electrical signals originating from one point in the body under examination to occur simultaneously in the system, ie to have their relative time shifts eliminated, whereby they can be added or summed to give a single electrical signal representing the total echo from the point as received by the transducer.

The line 23 from the transducer and its extension represents a scan line. Following emission of an ultrasound pulse from the transducer echoes will preferably be selected from one such scan line at a time following an emitted ultrasound pulse. This is done by electronically focusing the transducer. When echoes have been received from all points along the selected scan line, ie down to a predetermined maximum depth, the next scan line is selected by shifting the active transducer aperture to a new position. A new ultrasound pulse is emitted, and echoes are received from all points along the new scan line. By sequentially shifting the scan lines a substantially planar imaging field can be scanned. The scan lines can either be parallel or they can diverge away from the transducer to form a sector scan.

The totality of echoes received along a particular scan line represent an ultrasound mapping of the tissue structures along that scan line. By proper processing the totality of scan lines taken across the imaging field a two-dimensional image of the organs and tissue structures in the imaging field can be produced.

In the preferred embodiment of the invention the delay line 31 is composed of several delay lines D1 to D5 coupled in series, so that the output of the one delay line (eg D1) is used as input for the next delay line (eg D2) etc. whereby the delayed signal from of the delay lines can be further delayed in one or more following delay lines. The outputs MaxD1 to MaxD5 from the delay lines D1 to D5 are connected to a selector 33 for maximum delay.

Each of the delay lines D1 to D5 has a number of input taps 32 each resulting in an incrementally shorter delay through the delay line than the previous tap. Thus, in the delay chain composed of the delay lines D1 to D5, a signal input on the first one of the taps on D1 will be given the maximum possible delay through the delay chain. Likewise, a signal input on the last one of the taps on D5 will be given the minimum possible delay through the delay chain.

According to the invention the relative time shifts between the electrical signals from the transducer elements are eliminated as follows. The totality of individual electrical signals from the transducer elements are fed to a switching matrix or network 30. The switching network 30 feeds the electrical signals from the transducer elements 11 to input taps 32 of a delay line 31.

At each instant in time after emission of an ultrasound pulse the transducer should ideally be focused on a single point. This is done by delaying the electrical signals from the transducer elements individually. The first arriving signal is fed via the switching matrix 30 to a specific input tap of the delay line D1. One or more other signals arriving at the transducer and requiring the same delay are fed to the same input tap on the delay line. Later arriving signals require less delay in the delay line and are therefore fed to subsequent input taps, so that all electrical signals representing ultrasound echoes originating from the same point in the body under examination are sequentially summed in the delay line and will leave the delay line simultaneously at its output 34 for further processing. The transducer is thus focused on a single point by electrically delaying the electrical signals from the transducer elements.

As echoes arrive from points at increasing depths along the scan line, the focus of the transducer should accordingly change currently in order to, at every instant in time, be focused on the point of origin of the echoes, so that all the electrical signals from the transducer elements originating from any point on the scan line will be summed in the delay line and will leave the delay line at a common instant in time.

To achieve this the settings of the switching network or matrix 30 is currently updated according to a predefined scheme. The connection from each individual one of the piezoelectric transducer elements through the switching matrix 30 to a selected one of the input taps 32 of the delay line is switched to another input tap 32 at the time when the new setting results in a better match or approximation of the actual transducer focus to the ideal focus. This may involve changing of one or several such connections simultaneously, and in the switching matrix 30 connections are typically switched from one input tap on the delay chain to a neighboring input tap.

For each point of origin of ultrasound echoes along a scan line it is the goal to have the electrical signals representing ultrasound echoes received by the array of piezoelectric transducer elements so that their relative time shifts are eliminated, and that they will leave the delay chain 31 at its output 34 aligned in time, whereby the output signal from the delay line, at each point in time, will represent the sum of the ultrasound echoes from a particular point on the scan line.

To achieve this, the electrical signal representing the first received echo from a particular point on the scan line is fed through the switching matrix 30 to a selected one of the input taps 32 of the delay line, eg the first tap. This signal will then be shifted through the delay chain and will eventually appear delayed on the output 34 of the delay chain. On its way through the delay chain the signal will "pass" all the intermediate input taps 32 of the delay chain. Each electrical signal from another transducer element representing an echo from the same point on the scan line received later than the first signal will be fed to the input tap of the delay chain, at which the first signal has reached, and added to the first signal. All the electrical signals representing echoes from the same point on the scan line are thus added, as they are received, in the delay chain. One or several signals from transducer elements received at times differing less than the differential delay between input taps are connected to one and the same input tap on the delay chain simultaneously.

This, of course, assumes knowledge of the propagation speed of ultrasound in the tissue of the body under examination. For soft tissue, that can be examined with ultrasound, the speed is usually assumed to be uniform and constant. With this assumption it is possible, for any point in the tissue, and in particular any point on the scan line, to predict the exact time of arrival of the echoes at each of the transducer elements. According to the invention the current updating of the switching network or matrix 30 is done as described above.

The delay chain 31 has a maximum delay of some microseconds, say 25 microseconds, and in the order of one hundred input taps. This means that in average the difference in delay between two neighboring input taps will be a few tens of nanoseconds, say 25 nanoseconds. When feeding a signal from a transducer element through the switching matrix 30 to an input tap 32 of the delay chain 31, it may be theoretically impossible to feed a later arriving signal exactly to the input tap at which the first signal is "passing", and each of the later arriving signals will therefore be fed to the taps resulting in the smallest time error.

In other words, this means that the receiving focus of the transducer is being currently changed to adapt it to the ideal instantaneous focus. At each change in the setting of the switching matrix 30 only one or possibly several connections may be changed simultaneously, and for each transducer element a switching to another input tap on the delay chain is made when the new setting of the switching matrix 30 results in a focus of the transducer that is closer to the ideal than with the previous setting.

In another aspect of the invention the switching noise is removed as described above.

What is claimed is:

1. A method of operation of an apparatus for examining an object by means of ultrasound, wherein the apparatus comprises:

a receiving transducer having a plurality of receiving transducer elements, each receiving transducer element being adapted to output an electrical signal in response to a received ultrasound echo from a structure in the object, a single delay line with a plurality of input taps and an output tap, each of the plurality of input taps having an individual delay associated therewith, so that the electrical signals input to individual input taps are individually delayed and output on the output tap, and means for selectively connecting the electrical signals from the receiving transducer elements to respective ones of the input taps of the delay line;

and the method comprises:

inputting the electrical signals from the receiving transducer elements to respective ones of selected input taps of the single delay line, the electrical signals representing received echoes from a first selected structure in the object, and outputting on the output tap the delayed electrical signals representing received ultrasound echoes from the first selected structure in the object according to the condition that the maximum difference in time of output between the delayed signals is not greater than the greatest difference in delay between any two neighboring input taps on the delay line, and for subsequently received electrical signals representing received echoes from a second selected structure in the object, shifting, as necessary, the subsequent signals from the receiving transducer elements to other selected input taps of the single delay line, so that the delayed electrical signals representing received echoes from the second selected structure in the object also fulfill the aforesaid condition that the maximum difference in time of output between the delayed signals is not greater than the greatest difference in delay between any two neighboring input taps on the delay line.

2. The method according to claim 1 further comprising, for a plurality of structures in the object, the plurality of structures being at different distances from the transducer and defining a scan line in the object:

recording a plurality of echo signals from the plurality of structures on the scan line in the object, and subtracting, from the plurality of echo signals a stored plurality of reference signals recorded in a mode of no emission of ultrasound signals.

\* \* \* \* \*